United States Patent
DiGiovanni et al.

(10) Patent No.: US 7,437,046 B2
(45) Date of Patent: Oct. 14, 2008

(54) OPTICAL FIBER CONFIGURATION FOR DISSIPATING STRAY LIGHT

(75) Inventors: David John DiGiovanni, Mountain Lakes, NJ (US); Yoshihiro Emori, Watchung, NJ (US); Michael Fishteyn, Bridgewater, NJ (US); Clifford Headley, Raritan Township, Hunterdon County, NJ (US)

(73) Assignee: Furukawa Electric North America, Inc., Norcross, GA (US)

( * ) Notice: Subject to any disclaimer, the term of this patent is extended or adjusted under 35 U.S.C. 154(b) by 0 days.

(21) Appl. No.: 11/705,229

(22) Filed: Feb. 12, 2007

(65) Prior Publication Data

US 2008/0193093 A1 Aug. 14, 2008

(51) Int. Cl.
G02B 6/02 (2006.01)
G02B 6/26 (2006.01)

(52) U.S. Cl. .................. 385/128; 385/126; 385/43

(58) Field of Classification Search .............. 385/126, 385/128, 43
See application file for complete search history.

(56) References Cited

U.S. PATENT DOCUMENTS

| 5,864,644 | A |   | 1/1999  | DiGiovanni et al. |
|-----------|---|---|---------|-------------------|
| 5,898,715 | A | * | 4/1999  | LeGrange et al. ............... 372/6 |
| 6,381,045 | B1|   | 4/2002  | DiGiovanni et al. |
| 6,456,637 | B1|   | 9/2002  | Holcomb et al. |
| 6,477,295 | B1| * | 11/2002 | Lang et al. ..................... 385/31 |
| 6,513,994 | B1| * | 2/2003  | DiGiovanni et al. .......... 385/95 |
| 6,574,406 | B2|   | 6/2003  | Ainslie et al. |
| 6,687,445 | B2|   | 2/2004  | Carter et al. |
| 6,731,837 | B2|   | 5/2004  | Goldberg et al. |
| 6,941,053 | B2|   | 9/2005  | Lauzon et al. |
| 6,954,575 | B2| * | 10/2005 | Fermann et al. ............. 385/128 |
| 6,959,022 | B2| * | 10/2005 | Sandrock et al. ............... 372/6 |
| 7,046,432 | B2|   | 5/2006  | Starodoumov |
| 7,058,260 | B2|   | 6/2006  | Hodge et al. |
| 7,146,073 | B2|   | 12/2006 | Wan |
| 2002/0172486 | A1 | * | 11/2002 | Fermann ...................... 385/128 |
| 2004/0008955 | A1 | * | 1/2004  | Patlakh et al. ................. 385/95 |
| 2004/0156401 | A1 | * | 8/2004  | Sandrock et al. ............... 372/6 |
| 2004/0175086 | A1 |   | 9/2004  | Reith et al. |
| 2005/0094952 | A1 |   | 5/2005  | Gonthier et al. |
| 2005/0207455 | A1 |   | 9/2005  | MacCormack et al. |
| 2005/0232313 | A1 | * | 10/2005 | Fermann et al. ................. 372/6 |
| 2006/0008219 | A1 | * | 1/2006  | Davis .......................... 385/123 |
| 2006/0045444 | A1 |   | 3/2006  | Miller et al. |
| 2006/0219673 | A1 | * | 10/2006 | Varnham et al. ......... 219/121.6 |

(Continued)

OTHER PUBLICATIONS

"Cladding-Pumped Optical Fiber Amplifier" Furukawa Review No. 26, 2004.

(Continued)

*Primary Examiner*—K. Cyrus Kianni
(74) *Attorney, Agent, or Firm*—Wendy W. Koba (57) ABSTRACT

An optical transmission fiber is formed to include a relatively low-index, relatively thin outer cladding layer disposed underneath the protective polymer outer coating. Stray light propagating along an inner cladding layer(s) within the fiber will be refracted into the thin outer cladding (by proper selection of refractive index values). The thin dimension of the outer cladding layer allows for the stray light to "leak" into the outer coating in a controlled, gradual manner so as to minimize heating of the coating associated with the presence of stray light. The inventive fiber may also be bent to assist in the movement of stray light into the coating.

10 Claims, 5 Drawing Sheets

U.S. PATENT DOCUMENTS

2007/0172174 A1* 7/2007 Scerbak et al. .................. 385/76

OTHER PUBLICATIONS

Koji Seo et al. "Development of High-Power Stable PLC-Pump Combiner", Furukawa Review No. 23, 2003.

J.M. Oh et al. "Increased Pulsed Amplifier Efficiency by Manipulating the Fiber Dopant Distribution", 2006 Optical Society of America.

J.M. Fini et al. "Suppression of Stimulated Raman Scattering in a Cladding Pumped Amplifier with an Yb-Doped Filter Fiber" 2005 Optical Society of America.

Andre Croteau et al. "Bending Insensitive Highly Yb-Doped LMA Triple-Clad Fiber for Nearly Diffraction-Limited Laser Output", Proc. of SPIE vol. 6101, 6101G, (2006).

* cited by examiner

OPTICAL FIBER CONFIGURATION FOR DISSIPATING STRAY LIGHT

TECHNICAL FIELD

The present invention relates to an optical fiber useful for managing the presence of stray light in fiber-based laser, amplifier or light combiner applications and, more particularly, to an optical fiber including a thin outer cladding layer disposed between an inner cladding and an outer coating, the thin outer cladding used to contain and manage any light (pump and/or signal) that is present in the inner cladding layer, and dissipate this stray light in a controlled manner to minimize heating of the fiber's outer coating.

BACKGROUND OF THE INVENTION

Cladding-pumped fiber devices, such as lasers, amplifiers and light combiners, are important in a wide variety of optical applications, including high power communication systems, light sources for printers, lasers for medical optics, and the like. A typical cladding-pumped optical fiber comprises a signal core and a plurality of cladding layers. The inner cladding surrounding the core is typically a silica cladding of large cross-sectional area (as compared to the core) and high numerical aperture (NA). It is usually non-circular to ensure that the modes of the inner cladding will exhibit good overlap with the core. An outer coating is commonly composed of a low index polymer. The index of the core is greater than that of the inner cladding which, in turn, is greater than the index of the outer coating.

A major advantage of the cladding-pumped fiber is that it can convert light from low brightness sources into light of high brightness in the single mode fiber core. Light from low brightness sources, such as diode arrays, can be coupled into the inner cladding as a result of its large cross-sectional area and high numerical aperture. In a cladding-pumped laser or amplifier, the core is doped with a rare earth such as ytterbium (Yb) or erbium (Er). The light in the cladding interacts with the core and is absorbed by the rare earth dopant. If an optical signal is passed through the pumped core, it will be amplified. Alternatively, if optical feedback is provided (as with a Bragg grating optical cavity), the cladding-pumped fiber will act as a laser oscillator at the feedback wavelength.

Figure 1:
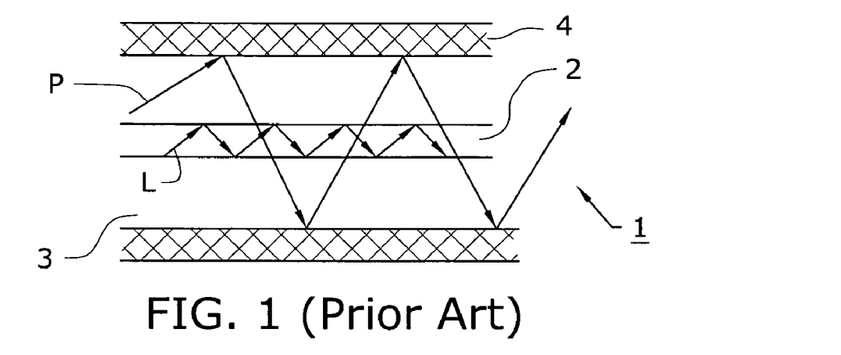
FIG. 1 is a side view of an exemplary prior art cladding-pumped optical fiber.

FIG. 1 illustrates an exemplary prior art cladding-pumped fiber 1 having a core 2, an inner (or pump) multimode cladding layer 3, and an outer coating 4. Inner cladding layer 3 exhibits a refractive index lower than that of core 2 such that the light signal L propagating along core 2 will remain confined therein, as shown in FIG. 1. Similarly, outer coating 4 confines pumping light P within the boundaries of inner cladding layer 3, as shown. In accordance with the cladding-pumped arrangement, the rays comprising pump light P periodically intersect core 2 for absorption by the active material therein, so as to generate or amplify light signal L. It is to be noted that since inner cladding 3 is multimode, many rays other than those shown by the arrows in FIG. 1 can propagate within inner cladding 3.

Figure 2:
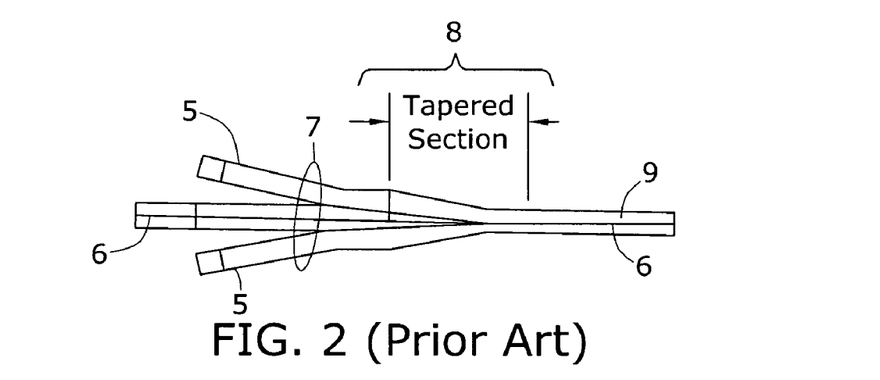
FIG. 2 is a side view of an exemplary prior art tapered fiber bundle input to a cladding-pumped optical fiber.

A difficulty preventing full exploitation of the potential of cladding-pumped fiber devices is the problem of efficiently coupling a sufficient number of low brightness sources into the inner cladding. A proposed solution to this problem is described in U.S. Pat. No. 5,864,644, entitled "Tapered Fiber Bundles for Coupling Light Into and Out of Cladding-Pumped Fiber Devices", issued to D. J. DiGiovanni et al. on Jan. 26, 1999. In the DiGiovanni et al. arrangement, light is coupled from a plurality of sources to a cladding-pumped fiber by the use of a tapered fiber bundle, formed by grouping individual fibers into a close-packed formation and heating the collected fibers to a temperature at which the bundle can be drawn down into a tapered configuration. The taper is then fusion spliced to the cladding-pumped fiber. FIG. 2 illustrates an exemplary embodiment of this DiGiovanni et al. prior art approach, where a plurality of pump fibers 5 are shown as distributed around a fiber containing a core 6. As shown, the entire bundle 7 is fused and tapered along a section 8 to a single output cladding-pumped fiber 9. As described therein, tapering of the fiber bundle is performed to increase the intensity of pump light coupled into the end of cladding-pumped fiber 9. Inasmuch as the NA of the multimode pump region is much greater than the NA of the pump fibers, tapering of the fiber bundle allows for an increase in the optical pump intensity while remaining within the angular acceptance of the multimode pump region.

Even though the DiGiovanni et al. tapered fiber bundle has been found to greatly improve the efficiency of coupling multiple optical signals into a fiber amplifier, laser or light combiner, problems attributed to the presence of "stray light" within the system remain to be solved. Stray light has been found to arise from a number of different sources, such as amplified spontaneous emission (ASE) within a gain fiber, unabsorbed or scattered pump light, and signal light that has scattered out of the core and into the inner cladding. While the prior art arrangement of FIG. 1 is capable of transmitting stray light with minimal attenuation and without heating the fiber, stray light may result in catastrophic heating if it is not permanently contained within the boundary of inner cladding 3. The escape of stray light from the cladding can occur if the NA of the cladding light is increased at a perturbation (such as a taper) to exceed the NA between inner cladding 3 and outer coating 4. In this situation, cladding light refracts into outer coating 4 where it is absorbed and generates an unwanted amount of localized heating. Stray light may also refract into outer coating 4 at a termination of the cladding-pumped fiber, such as at the point where it is spliced to an output fiber (such fibers generally have a high index outer coating) or at any point along the fiber where it is bent to a degree sufficient to couple light into the cladding layer.

Figure 3:
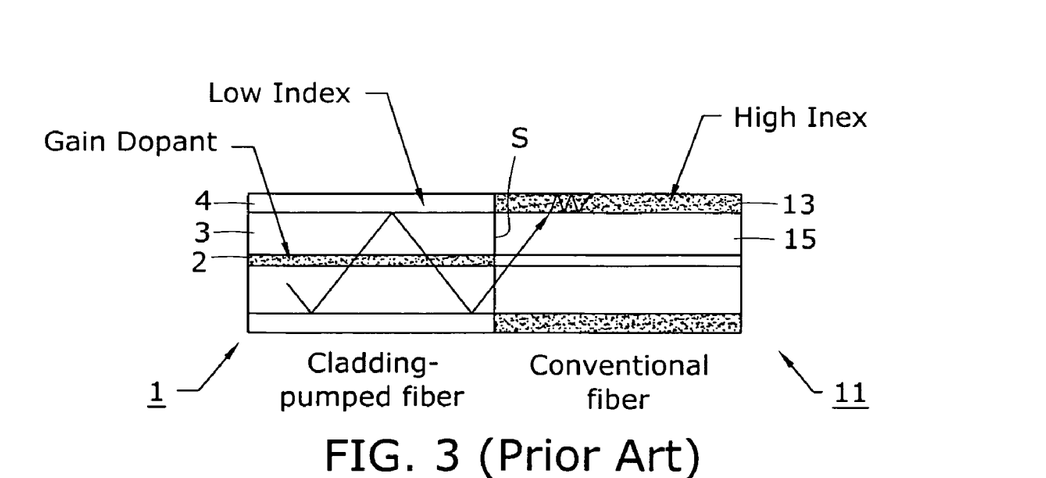
FIG. 3 is a side view of a splice location between a cladding-pumped fiber and a transmission fiber, illustrating the potential for the creation of stray light at the splice.

FIG. 3 illustrates the above-described situation where stray light is associated with a termination condition, in this case at a splice S between cladding-pumped fiber 1 of FIG. 1 and an output fiber 11. As shown, unabsorbed/scattered pump light remaining at the termination of cladding-pumped fiber 1 enters output fiber 11 and refracts into a high index polymer outer coating 13. Since the optical absorption of polymer outer coating 13 is much greater than that of glass, a significant portion of the light is absorbed by coating 13 and converted to heat. If this heat is sufficiently localized, the fiber may be burned or otherwise damaged to the point of experiencing catastrophic failure. Besides the presence of unabsorbed pump light, signal light can also be scattered out of core region 2 at the termination of fiber 1, whereupon it will propagate along inner cladding 15 and may also refract into high index cladding 13 to cause additional heating.

While heating can arise at a splice location between two dissimilar fibers (as shown here in FIG. 3), splices between identical fibers may also generate heat, as a result of slight imperfections that cause light scattering. Various other types of perturbations along the fiber may also result in increasing the presence of stray light along the fiber and thus potentially compound the problem of locally heating the fiber. Since the optical power levels can be high in amplifier applications, it is best to gradually dissipate the energy, thus avoiding localized heating of the fiber or any of its associated optical components.

Prior art attempts to address this problem typically involve the use of sections of "absorbing" fiber interspersed along the transmission path, where these sections include selectively absorbing species, such as rare earth ions, in concentrations sufficient to provide the desired absorbance selectivity. U.S. Pat. No. 6,574,406 issued to B. J. Ainslie et al. on Jun. 3, 2004, and US Application 2004/0175086 by L. A. Reith et al. and published on Sep. 9, 2004, disclose two different arrangements of this principle.

While these arrangements provide a certain degree of stray light management, the utilization of selected sections of fiber to provide this ability limits its usefulness. For example, if a new splice is added to a fiber, or a bend is introduced in a new location, the absorbing fiber sections may not be properly located to dissipate additional stray light. Moreover, the fiber section dimensions need to be carefully controlled to ensure that the energy is dissipated in a sufficiently gradual manner.

Thus, a need remains in the art for a configuration that is capable of managing the presence of stray light within an optical fiber so as to minimize heating of the fiber and/or other failure modes attributed to the presence of stray light.

SUMMARY OF THE INVENTION

The need remaining in the prior art is addressed by the present invention, which relates to an optical fiber configured to controllably dissipate stray light and, more particularly, to the inclusion of thin outer cladding layer between the inner cladding and the fiber outer (polymer) coating to contain light refracting out of the inner cladding and dissipate the light in a controlled manner along an extended portion of the fiber's outer coating.

In accordance with the present invention, an optical transmission fiber is formed to include a relatively thin outer cladding layer disposed to surround the inner cladding layer and thus capture and contain stray light (including remaining pump light and/or refracted signal light). The limited thickness of the outer cladding permits stray light to propagating therealong while "leaking" or "tunneling" into the outer coating in a controlled manner. In a preferred embodiment, a thickness of no more than 10 µm (or, even better, 5 µm) is defined for the outer coating layer. By forcing the stray light to be dissipated along an extended portion of the outer coating, localized heating of the polymer outer coating will be virtually eliminated, preventing thermally-induced catastrophic failure of the fiber.

The thin outer cladding layer is formed to exhibit a refractive index less than that of the inner cladding (in order to promote the reflection of light within the inner cladding), where the outer cladding layer may exhibit either a step-index or graded-index profile with respect to the refractive index values of the inner cladding and outer coating.

In one embodiment, a plurality of scattering or absorbing sites may be formed within the outer cladding layer, or at the boundary between the inner and outer claddings, to facilitate the movement of stray light from the inner cladding to the outer cladding.

It is an aspect of the present invention that the inclusion of a thin ("leaky") outer cladding layer may be utilized in virtually any fiber-based arrangement where thermal management of stray light is a concern. For example, fiber amplifiers, fiber-based lasers, laser combiner bundles, all generate a significant amount of stray light energy that can become problematic. Further, environmental situations (such as where a fiber needs to be confined in a bent position, or at a splice between different fiber sections) can increase the presence of stray light. In any of these situations, the inclusion of a thin outer cladding layer adjacent to a polymer-based fiber outer coating will controllably manage the dissipation of the stray light along an extended portion of the outer coating.

These and other embodiments and features of the present invention will become apparent during the course of the following discussion and by reference to the accompanying drawings.

BRIEF DESCRIPTION OF THE DRAWINGS

Referring now to the drawings.

DETAILED DESCRIPTION

Figure 4:
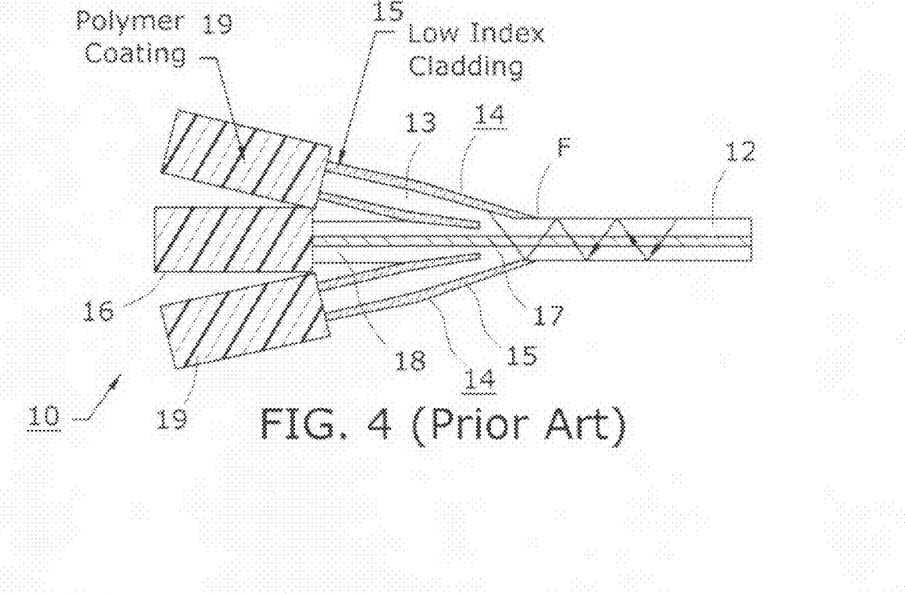
FIG. 4 contains a somewhat more detailed illustration of a prior art tapered fiber bundle, illustrating the introduction of backward-propagating stray light into the fiber bundle.

An exemplary prior art tapered fiber bundle 10 is shown in FIG. 4, in this case illustrating the propagation of backward-scattering stray light that re-enters bundle 10 from a cladding-pumped fiber 12 that is fused to bundle 10. Bundle 10 is illustrated as comprising a plurality of pump fibers 14 and a signal fiber 16. Using methods well-known in the art, bundle 10 is adiabatically tapered down until its outer diameter matches the outer diameter of cladding-pumped fiber 12 at location F, where the two fibers are then fusion spliced together. Signal fiber 16 comprises a core region 17 (which may be single mode or multimode), surrounded by a relatively large diameter (e.g., 125 µm) cladding layer 18. Pump fibers 14 comprise a relatively large silica core 13 (e.g., 105 µm) and a thin (e.g., 10 µm), low-index cladding layer 15. As discussed above, the refractive index of cladding layer 18 is less than the refractive index of core region 17 so as to confine the propagating signal light to the fiber axis along the core.

Figure 5:
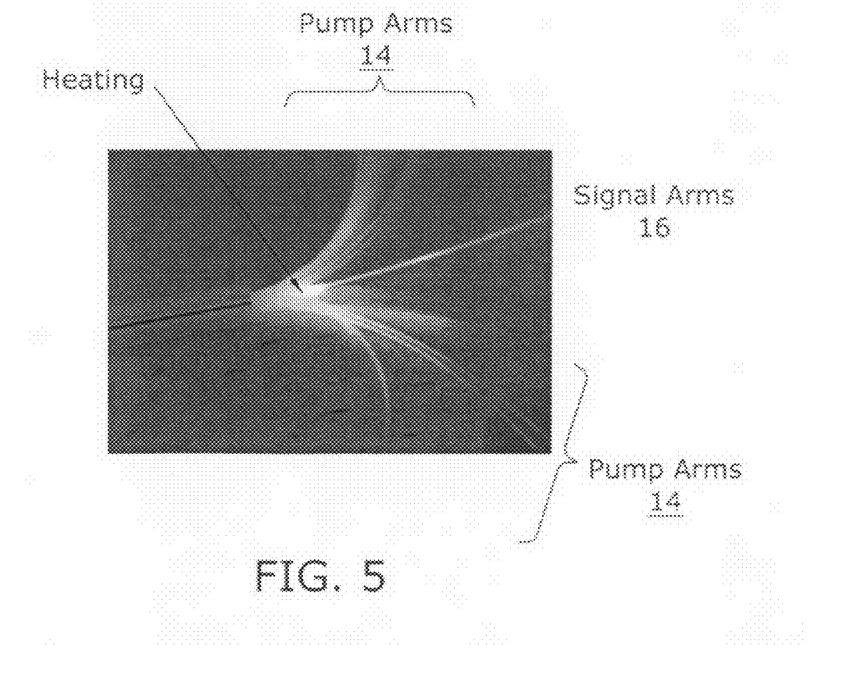
FIG. 5 is an optical/thermal photograph of the prior art tapered bundle of FIG. 4, illustrating the generation of localized heating of the signal fiber as a result of the presence of stray light.

It is known that even small amounts of stray light can result in a significant rise in the temperature of tapered fiber bundle 10, leading (at times) to catastrophic failure. As mentioned above, stray light arises from one or more sources, including ASE within signal fiber 16, unabsorbed pump light P associated with a counter-propagating pump source (indicated by the "backward" arrow in FIG. 4) and/or signal light that scatters out of the core region of signal fiber 16. FIG. 5 contains an optical/thermal photograph illustrating this principle, where the presence of stray light is induced by the use of a backward-propagating signal that is coupled into each of the fibers forming the bundle. By separating the fibers and monitoring their temperatures with a thermal camera, a significantly higher temperature within signal fiber 16 is evident by the white spot within the center of the thermal image.

It has been found that the difference in generated temperature between a signal fiber and pump fibers, such as shown in the photograph of FIG. 5, can be attributed to the particular cladding structure utilized with pump fibers. In particular, and with reference again to FIG. 4, backward traveling light that is coupled into a conventional signal fiber 16 will enter the surrounding cladding layer 18, and thereafter be guided into outer polymer coating 19. Since the polymer has high optical absorption, this light is quickly converted into undesirable heat energy. Light entering pump fibers 14, on the other hand, is predominantly captured by silica core 13 and guided at the glass interface between silica core 13 and low-index cladding 15. As a result, the backward propagating light within the pump fibers minimally interacts with the overlying polymer, and no significant heating occurs. Therefore, in accordance with the present invention, the amount of heating associated with stray light propagating along signal fibers is reduced by incorporating an additional cladding layer to manage the distribution of the optical energy along the length of the fiber.

Figure 6:
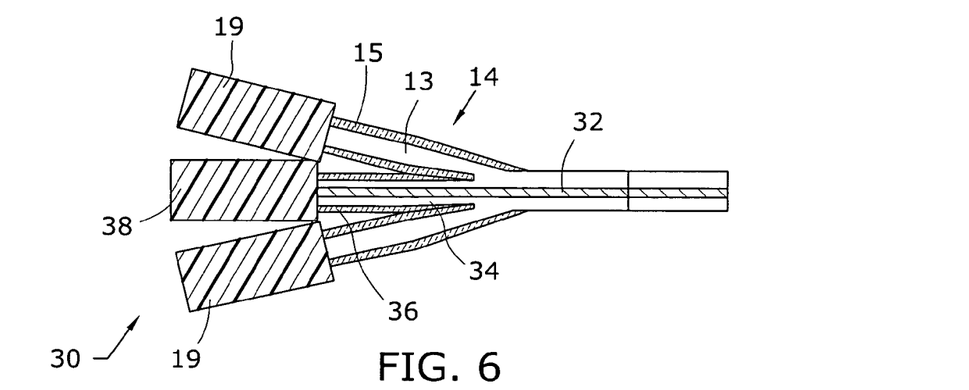
FIG. 6 is a side view of an exemplary tapered fiber bundle formed in accordance with the present invention, including "thermally-managed optical transmission fiber" comprising a thin outer cladding layer within the signal fiber to controllably dissipate stray light along the outer coating.

FIG. 6 illustrates a tapered fiber bundle formed in accordance with the present invention, where a signal fiber 30 is particularly configured to include a thin (i.e., "leaky"), lower index outer cladding layer that is used to strip away the stray light propagating along the inner cladding and controllably leak this stray light along an extended portion of the outer coating. This leaking (or tunneling) effect may be enhanced by bending the fiber, as discussed below. Pump fibers 14 as illustrated in FIG. 6 are essentially identical to those included within the prior art structure of FIG. 4.

Figure 7:
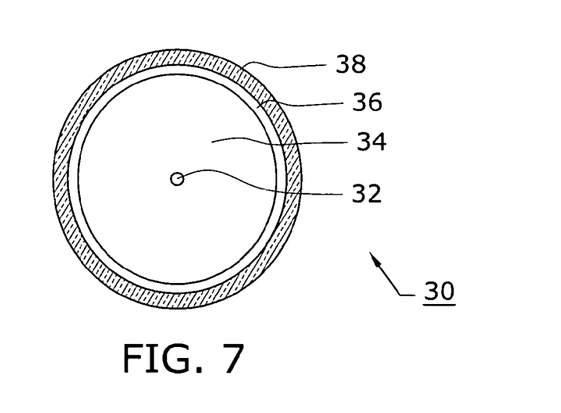
FIG. 7 is a cross-sectional view of an exemplary thermally-managed optical transmission fiber formed in accordance with the present invention.
Figure 8:
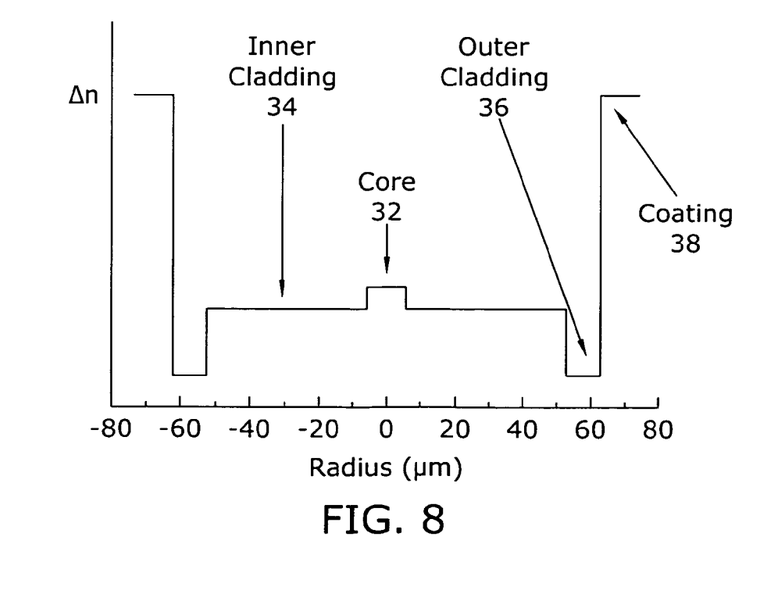
FIG. 8 illustrates the refractive index profile for the inventive fiber of FIG. 7.

FIG. 7 contains a cross-sectional view of an exemplary thermally-managed, high power signal fiber 30 formed in accordance with the present invention. As shown in both FIGS. 6 and 7, thermally-managed high power signal fiber 30 comprises a core region 32, an inner cladding 34 of relatively large cross-sectional area, a thin outer cladding layer 36 (where thin outer cladding 36 has a refractive index less than that of inner cladding 34—either a constant-value refractive index or a graded-index value), and a polymer coating 38 covering outer cladding 36 (coating 38 having a refractive index greater than that of inner cladding 34). FIG. 8 contains a refractive index profile (not to scale) for the exemplary fiber 30 of this particular embodiment of the present invention.

As discussed above, thin outer cladding layer 36 functions to trap and guide any stray light, whether remaining pump light or refracted signal light, and prevent this light from directly interacting with and heating localized portions of polymer coating 38. Since outer cladding layer 36 is intentionally formed to be relatively thin (e.g., less than 10 microns, or even 5 microns in thickness), the stray light will gradually leak/tunnel into polymer coating 38 as the light propagates along outer cladding layer 36. Indeed, by maintaining the thickness of outer cladding 36 to less than 10 µm, stray light will tunnel through outer cladding 36 such that the optical energy is thereafter gradually distributed along an extended portion of outer coating 38.

Figure 9:
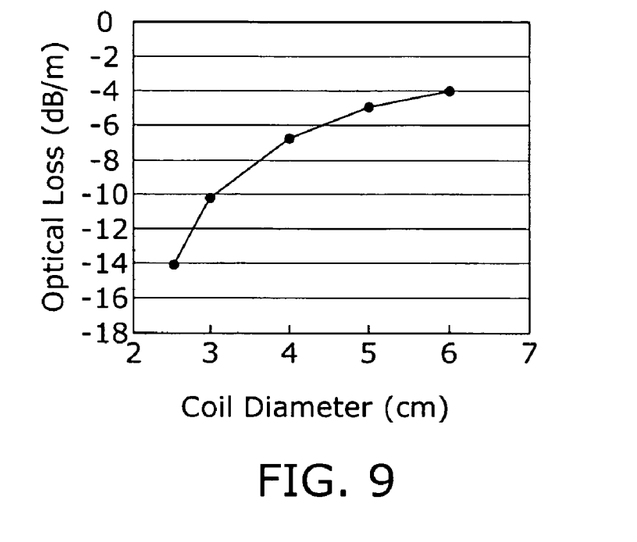
FIG. 9 is a graph of optical loss as a function of fiber bend radius, illustrating the use of controlled fiber bending to assist in the removal and dissipation of stray light.
Figure 10:
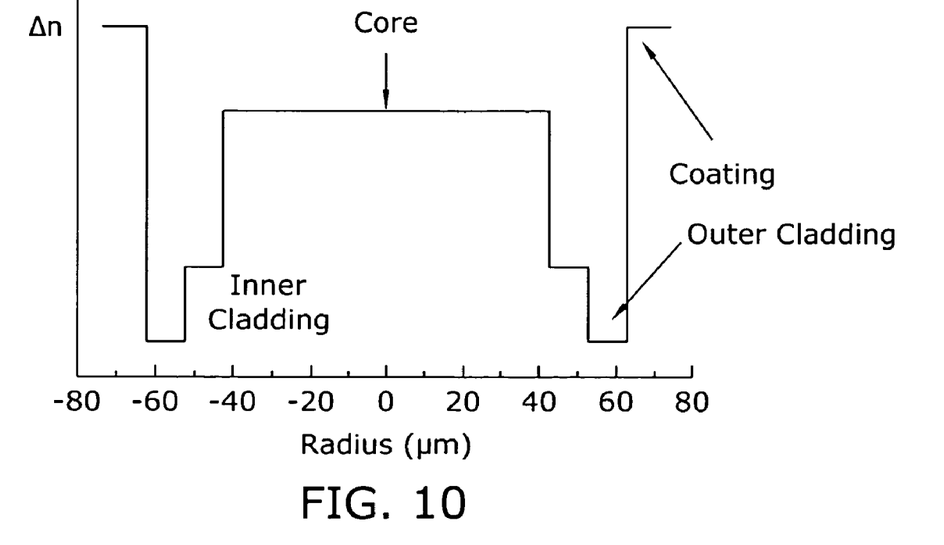
FIG. 10 is a refractive index profile of an exemplary inventive fiber used to collect the data for the graph of FIG. 9.

The tunneling from thin outer cladding 36 into polymer coating 38 can be enhanced by bending the fiber, as mentioned above. In particular, and as shown in the graph of FIG. 9, as the bend diameter of the inventive fiber is reduced, the structure becomes more lossy. The graph of FIG. 9 was generated for a fiber having a core diameter of 105 µm, an outer cladding diameter of 114 µm, and an outer coating diameter of 250 µm, as shown in the associated refractive index profile of FIG. 10. The difference in refractive index between the inner and outer cladding layers ($\Delta n$) was approximately 0.0167, and the outer coating was a conventional UV-cured acrylate coating with an index higher than that of the inner cladding. The core was fully filled with light, and the throughput was monitored at various bend diameters. As shown in FIG. 9, the rate of loss of light can be "tuned" by varying the bend diameter. It is to be noted that even at larger bend diameters it appears that the optical loss is non-zero. By virtue of the thin dimension of outer cladding 36, the bending may be performed without affecting the propagation of the signal within core region 32.

In most embodiments, the NA between inner cladding 34 and outer cladding 36 should be within the range of approximately 0.15-0.33. Using these values, therefore, outer cladding layer 36 may comprise a thickness of less than 10 µm and provide sufficient bend loss without disturbing the light signal propagating in core region 32. Outer cladding 36 may comprise glass or a polymer material. Cladding 36 may also be formed to contain scattering sites (such as, for example, alumina powder or crystallized polymer) either within its bulk or at its inner surface, to facilitate removal of the optical energy from inner cladding 34 and distribution of the energy along polymer coating 38. Coating 38 may be applied to the optical fiber during the fabrication process, or may be applied later, as the fiber is packaged—using a heat sink grease or bonding epoxy in the latter.

Figure 11:
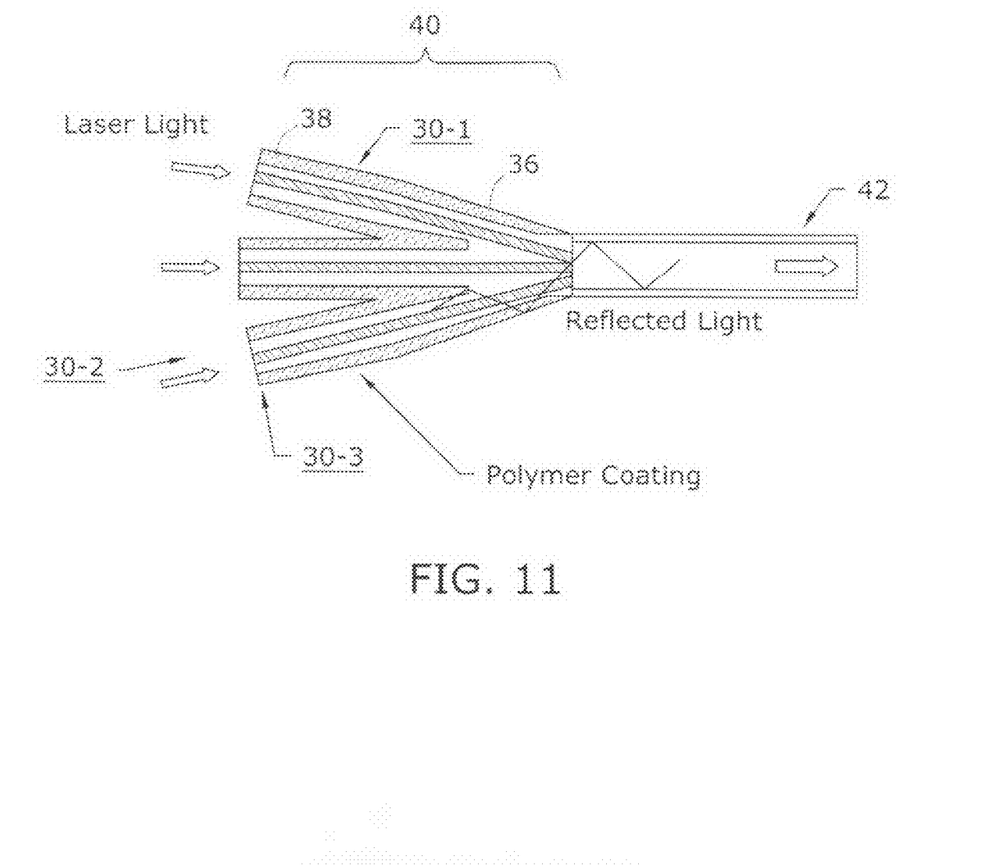
FIG. 11 is a side view of an exemplary laser combiner formed in accordance with the present invention, with each fiber including a thin outer cladding layer to dissipate stray light.

While the above discussion has focused on the issue of thermal management within the signal fiber of a tapered fiber bundle, it is to be understood that similar thermal management concerns are present in other fiber-based optical arrangements where heating due to absorption of light is a concern. For example, fiber splices and fiber bends are configurations that are known to introduce stray light into the system. In these cases, therefore, a similarly constructed high power signal fiber including a thin, low index outer cladding layer may be utilized to facilitate the removal of this stray light and dissipate the light along an extended portion of the outer coating. Indeed, a laser combiner arrangement has been developed where a plurality of fibers that are associated with separate light sources are combined in a bundle through tapering and provided, as a group, as an input to a larger-core transmission fiber. FIG. 11 illustrates one such laser combiner arrangement, including the addition of a thin outer cladding layer along each laser input fiber, to provide for thermal management of stray light in accordance with the present invention.

Figure 12:
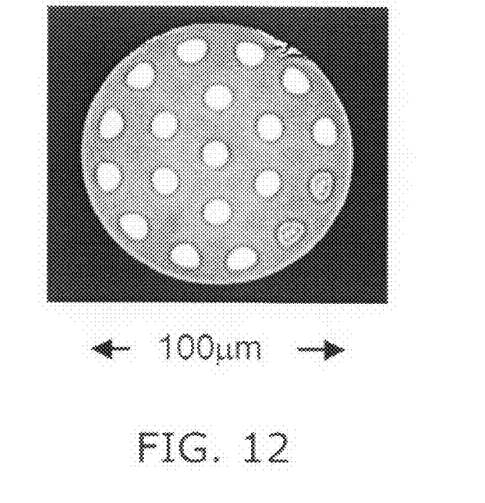
FIG. 12 is a cut-away view of the splice location between the laser-propagating fibers of FIG. 11 and an output fiber, illustrating the significant amount of interstitial spacing (between fiber cores) that may give rise to the generation of stray light within the system.

Referring to FIG. 11, a laser combiner 40 is shown as comprising a plurality of signal fibers 30 (shown as 30-1, 30-2 and 30-3) that are combined through a tapering arrangement into a large multimode core fiber 42. Each input signal fiber 30 contains high brightness, low NA light, such as single mode light from a fiber laser. An intended application of such a laser combiner 40 is in association with materials processing, where there is a high likelihood that a significant fraction of light (such as reflections from a molten metal surface) will be reflected back into the bundle of signal fibers as stray light. Upon reaching the entrance of the bundle of fibers 30, some fraction of the stray light will enter the interstitial spaces between the individual cores 32 (see FIG. 12 for an illustration of an exemplary plurality of cores and extensive interstitial spacing in such a bundle of laser-propagating fibers) and be guided into surrounding cladding regions 34. Thus, in the same manner as described above, problems associated with heating of outer polymer coating 38 are minimized by including outer cladding layer 36 to trap the stray light, and gradually dissipate this light along an extended length of polymer coating 38.

Indeed, it is to be understood that the above-described embodiments are illustrative of only a few of the many possible specific embodiments that can represent applications of the principles of the present invention. Numerous and varied other arrangements can be made by those skilled in the art without departing from the spirit and scope of the present invention as defined by the claims appended hereto.

What is claimed is:

1. An optical fiber configured to facilitate the removal of stray light, the optical fiber comprising
   a core region for substantially confining and propagating an optical signal;
   an inner cladding layer surround said core region, said inner cladding layer exhibiting a refractive index less than the core region refractive index;
   an outer cladding layer surrounding said inner cladding layer, said outer cladding layer exhibiting a refractive index less than the refractive index of said inner cladding so as to capture stray light propagating along said inner cladding layer, and having a thickness substantially less than the inner cladding to controllably dissipate captured stray light away from the optical fiber; and
   an outer coating surround said outer cladding layer and having a refractive index greater than the inner cladding layer refractive index, wherein the stray light captured by the outer cladding will gradually tunnel into the outer coating over an extended length thereof, reducing localized heating of said outer coating by the stray light.

2. An optical fiber as defined in claim 1 wherein the outer cladding further comprises a plurality of scattering sites for efficiently moving stray light from the inner cladding layer to said outer cladding layer.

3. An optical fiber as defined in claim 1 wherein the numerical aperture between the inner cladding and the outer cladding is in the range of 0.15 to 0.33.

4. An optical fiber as defined in claim 1 wherein the outer cladding layer exhibits a thickness no greater than 10 μm.

5. An optical fiber as defined in claim 4 wherein the outer cladding layer exhibits a thickness no greater than 5 μm.

6. An optical fiber as defined in claim 1 wherein the outer coating comprises a polymer material.

7. An optical fiber as defined in claim 1 wherein a substantially step index difference in refractive index is present between the inner cladding layer and the outer cladding layer.

8. An optical fiber as defined in claim 7 wherein the index difference between the inner and outer cladding layers is approximately 0.0167.

9. An optical fiber as defined in claim 1 wherein the outer cladding layer exhibits a graded index profile, decreasing in value from the interface with the inner cladding to the outer coating layer.

10. An optical fiber as defined in claim 1 wherein the outer cladding layer exhibits a graded refractive index profile, increasing in value from the interface with the inner cladding layer to the outer coating layer.

* * * * *